No. 6,694. PATENTED SEPT. 4, 1849.
G. SCOTT.
MOLD FOR MAKING GLASS PIPES.

UNITED STATES PATENT OFFICE.

GEO. SCOTT, OF ALBANY, NEW YORK, ASSIGNOR TO D. O. KETCHUM.

MOLD FOR MAKING GLASS PIPES.

Specification of Letters Patent No. 6,694, dated September 4, 1849.

*To all whom it may concern:*

Be it known that I, GEORGE SCOTT, of the city of Albany, in the county of Albany and State of New York, have invented a new and useful machine for constructing glass pipes uniform in thickness and constructed so as to fit closely into each other, called "Scott's glass-pipe mold;" and I do hereby declare that the following is a full, clear, and exact description of the construction and operation of the same, reference being had to the annexed drawings, making part of this specification, in which—

Figure 1:
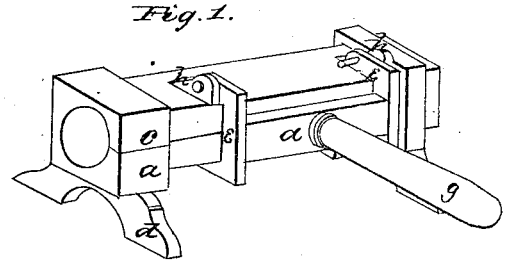
Figure 2:
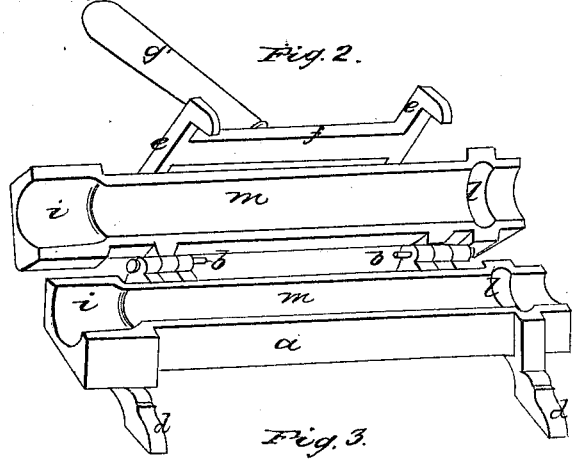
Figure 3:
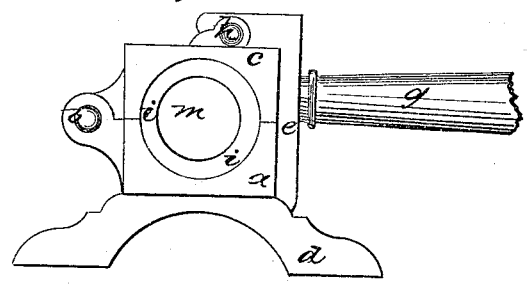

Figure 1 is a perspective view of the mold when closed; Fig. 2, a perspective view of the mold when open and Fig. 3 an end view of the mold.

To enable others skilled in the art to make and use my invention I will proceed to describe its construction and operation.

The same letters refer to the same parts in all the figures.

Its construction is that of a longitudinal mold or box (of cast iron or other suitable material—placed horizontally—the lower part of which is marked "a"—opening with hinges marked "b" as seen in Fig. 2. "c" represents the upper part of this mold or longitudinal box—which in shape is precisely the same with the lower part.

"d," "d," represents the legs or supports of the box or mold.

"e, e" represents the two clamps fastened by a cross bar "f" into which is inserted a handle "g." These clamps are fastened to the upper part "c" of the mold by hinges "h, h," and the object of these clamps is to hold the two parts of the mold together when in operation. The mode in which they do this may be seen in Fig. 1.

The general shape of the mold is that of a long box—of which the sides, the top and the bottom are about equal; but this is not material. Internally, the mold when closed is for the most of its length a hollow cylinder of uniform diameter as represented at letters "m, m," in Figs. 2 and 3, the dimensions of which are, about, in the proportion of three feet in length to three inches in diameter. At a distance of about two inches from one end of the mold, the size of this cylinder is increased by about half an inch in diameter—as may be seen by letters i, i, in Figs. 2 and 3 and continues of this enlarged size to the end of the mold—as may be thus seen in the drawing. At about the same distance, or a little less, from the other end of the mold, there is an enlargement of this cylinder forming what may be termed a ring or annular groove as may be seen at letters "l, l,"—in Fig. 2. The object of giving this shape to the inside of this mold will be shown hereafter.

The object of this machine is to blow glass pipes of sufficient thickness for conveying large quantities of water and for similar purposes.

In using it the glass blower takes upon his blow pipe a sufficient quantity of melted glass and forms the same into a tubular shape. An assistant then takes what is called "a post" (being a lump of heated glass upon the end of a rod and makes it adhere to the lower end of the melted glass on the blow pipe. The blower and his assistant then draw out this tube to a length a little greater than that of the mold: and, placing it in the lower part of the mold— they then shut down the upper part and secure it, with the clamps as in Fig. 1. The blower then by blowing causes the tube to assume shape of the interior of the mold. In doing this he is aided by the assistant, and also by the fact that the mold being open at each end—the glas swells out at each end of the mold into a spherical shape which is called the "blow over." By the pressing back both of these "blow overs" filled with wind the workmen are enabled to exert a much greater power than they could with the breath—and thus force the tube to fit every part of the mold. The reasons why the unusual degree of power (secured only as aforesaid) is needed are, 1st, that the pipe must be thick; second, that the diameter of a pipe is small in proportion to its length; 3rd, that to secure a uniformity of thickness the glass must be worked at a comparatively low heat—otherwise the melted glass would flow down to the lower side of the pipe. Another advantage of these two "blow overs" is the convenience, the security and exactness which they afford—by their thinness—for detaching the pipe when completed—from "the post"— and the blow pipe.

The former mode of making glass pipe has consisted in its being drawn out without the use of any mold; under which mode the pipes were uneven in thickness and irregular in their form, and the separate pieces could not be accurately fitted together. In the pipe made in this mold however—the shoulder of the pipe made in the large part, "$i$"—of the mold (Fig. 2) is exactly fitted to receive so much of the opposite end of a similar adjoining pipe as will extend up to the projection formed by the groove "$l$." By this construction these glass pipes may be easily cemented together as the common cast iron water pipes.

In the place of the enlargement—"$i$" and the groove "$l$" the cylinder might terminate (but not to advantage) in the hollow frustum of a cone with the corresponding hollow frustum at the other end.

In ordinary models for blowing glass, the glass is blown and the models open in a perpendicular direction. If that plan was adopted in this instance the mass of glass is so great that it would all sink to the bottom of the mold—: for this reason it is necessary to have the mold horizontal. It is also necessary to have the mold open at both ends; in order, by means of the "blow overs" as has been above described to force the glass completely into the shape of the mold.

What I claim as my invention and desire to secure by Letters Patent is not simply the invention of a mold for blowing glass—but, I claim—

The invention of a mold above described, open at each end, placed in a horrizontal position expressly for blowing uniform glass water pipes.

GEORGE SCOTT.

Witnesses:
DE WITT C. DE FOREST,
HAMILTON HARRIS.